(12) United States Patent
Matsumoto

(10) Patent No.: US 9,904,858 B2
(45) Date of Patent: Feb. 27, 2018

(54) OBSTACLE DETECTION APPARATUS

(71) Applicant: DENSO CORPORATION, Kariya, Aichi-pref. (JP)

(72) Inventor: Yuusuke Matsumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 177 days.

(21) Appl. No.: 15/047,453

(22) Filed: Feb. 18, 2016

(65) Prior Publication Data

US 2016/0247030 A1    Aug. 25, 2016

(30) Foreign Application Priority Data

Feb. 20, 2015   (JP) .................................. 2015-31741

(51) Int. Cl.
*G06K 9/00* (2006.01)
*B60R 1/00* (2006.01)

(52) U.S. Cl.
CPC ............ *G06K 9/00805* (2013.01); *B60R 1/00* (2013.01)

(58) Field of Classification Search
CPC ............................. G06K 9/00805; B60R 1/00

USPC ......................................................... 348/148
See application file for complete search history.

(56) References Cited

FOREIGN PATENT DOCUMENTS

| JP | H10-119673 | 5/1998 |
|---|---|---|
| JP | 2005-335496 | 12/2005 |
| JP | 2011-191238 | 9/2011 |

*Primary Examiner* — Nguyen Truong
(74) *Attorney, Agent, or Firm* — Knobbe, Martens, Olson & Bear, LLP

(57) ABSTRACT

In an obstacle detection apparatus, a signal output unit is configured to output a signal if an obstacle meets at least one preset signal output condition. A condition setting unit is configured to set at least one element of the at least one signal output condition to a value in dependence on a user entry value. A misalignment detection unit is configured to detect misalignment of an axial direction of a sensor with a longitudinal direction of a vehicle carrying the apparatus. In the apparatus, an allowable range limiting unit is configured to, if a degree of misalignment exceeds a predetermined misalignment threshold, limit an allowable range of values of the at least one element of the at least one preset signal output condition so as to make the at least one preset signal output condition less prone to be met.

8 Claims, 10 Drawing Sheets

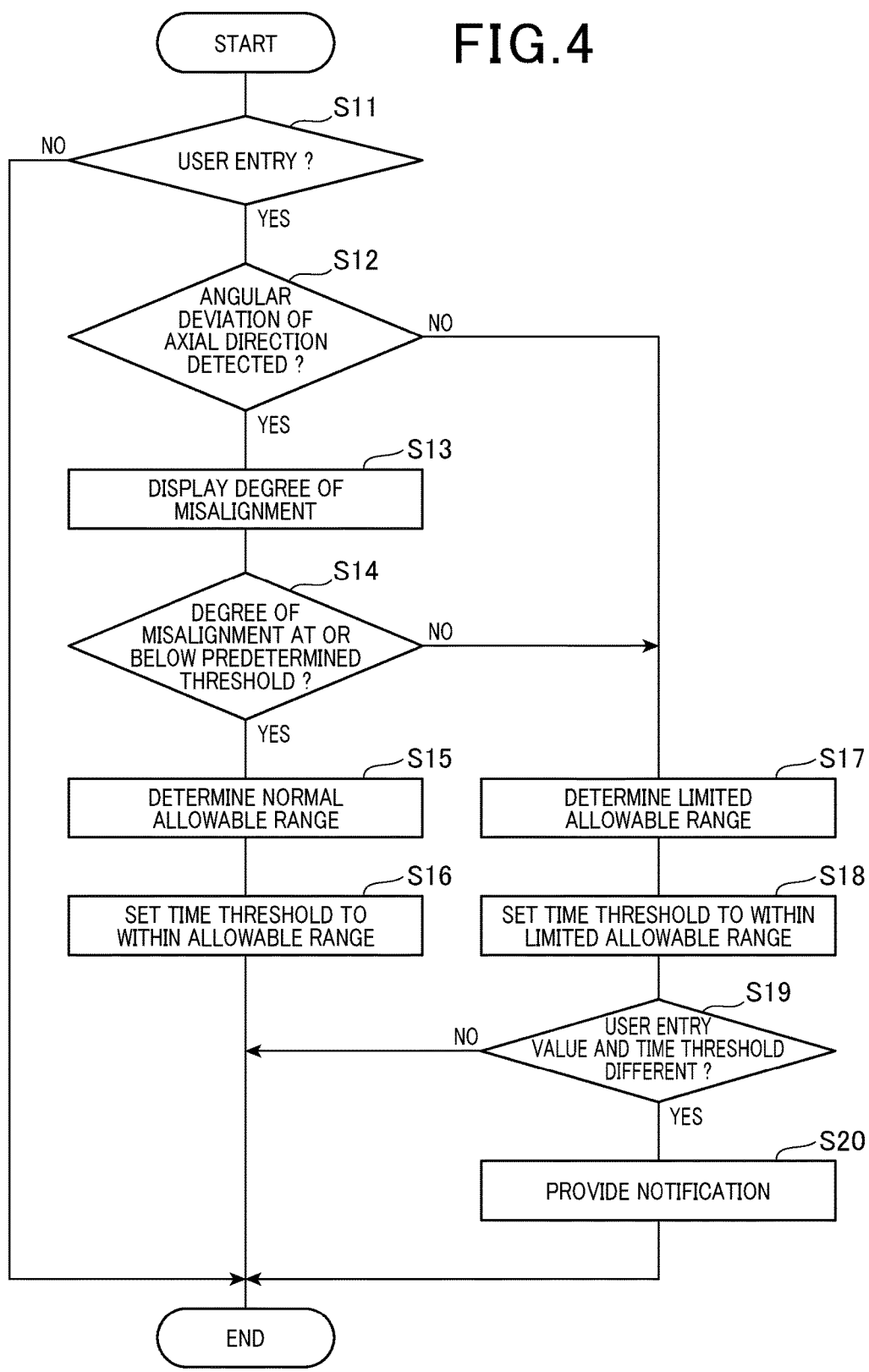

OBSTACLE DETECTION APPARATUS

CROSS-REFERENCE TO RELATED APPLICATION

This application is based on and claims the benefit of priority from earlier Japanese Patent Application No. 2015-31741 filed Feb. 20, 2015, the descriptions of which are incorporated herein by reference.

BACKGROUND

Technical Field

The present invention relates to an obstacle detection apparatus.

Related Art

Conventionally, a vehicle-mounted apparatus is known that is configured to detect an obstacle using a radar, and if a predicted collision time to collision with the obstacle is at or below a predetermined threshold, activate an alert or warning (see, for example, Japanese Patent Application Laid-Open Publication No. 1998-119673).

In such a vehicle, the threshold for determining when to activate the alert may be varied according to user preference. An axial direction of a radar and a longitudinal direction of the vehicle would usually coincide with each other, but these directions may be deviated for any reason. The misalignment of the radar axial direction from the longitudinal direction of the vehicle may cause an obstacle (e.g., guardrail or the like) that is not actually located in front of the vehicle to be incorrectly determined as being located in front of the vehicle. In such an event, a low user-set threshold may cause the alert to be activated for the obstacle that is not actually located in front of the vehicle.

In consideration of the foregoing, exemplary embodiments of the present invention are directed to providing an obstacle detection apparatus capable of preventing outputting an unnecessary signal.

SUMMARY

In accordance with an exemplary embodiment of the present invention, there is provided an obstacle detection apparatus including: an obstacle detection unit configured to detect an obstacle using a sensor; a signal output unit configured to output a signal if the obstacle detected by the obstacle detection unit meets at least one preset signal output condition; a condition setting unit configured to set at least one element of the at least one signal output condition to a value in dependence on a user entry value of the at least one element of the at least one signal output condition; an misalignment detection unit configured to detect misalignment of an axial direction of the sensor with a longitudinal direction of a subject vehicle carrying the apparatus; and an allowable range limiting unit configured to, if a degree of misalignment detected by the misalignment detection unit exceeds a predetermined misalignment threshold, limit an allowable range of values of the at least one element of the at least one preset signal output condition so as to make the at least one preset signal output condition less prone to be met as compared to when the degree of misalignment detected by the misalignment detection unit is at or below the predetermined misalignment threshold.

In the obstacle detection apparatus configured as above, if a degree of misalignment of the axial direction of the sensor exceeds a predetermined misalignment threshold, an allowable range of values of the at least one element of the at least one preset signal output condition is limited so as to make the at least preset signal output condition less prone to be met. This can prevent unnecessary signal output in the presence of misalignment of the axial direction of the sensor.

BRIEF DESCRIPTION OF THE DRAWINGS

FIG. 4 is a flowchart of signal output condition setup processing to be performed in the obstacle detection apparatus of FIG. 1;

DESCRIPTION OF SPECIFIC EMBODIMENTS

Embodiments of the present invention will now be described with reference to the accompanying drawings.

First Embodiment

1. Obstacle Detection Apparatus

Figure 1:
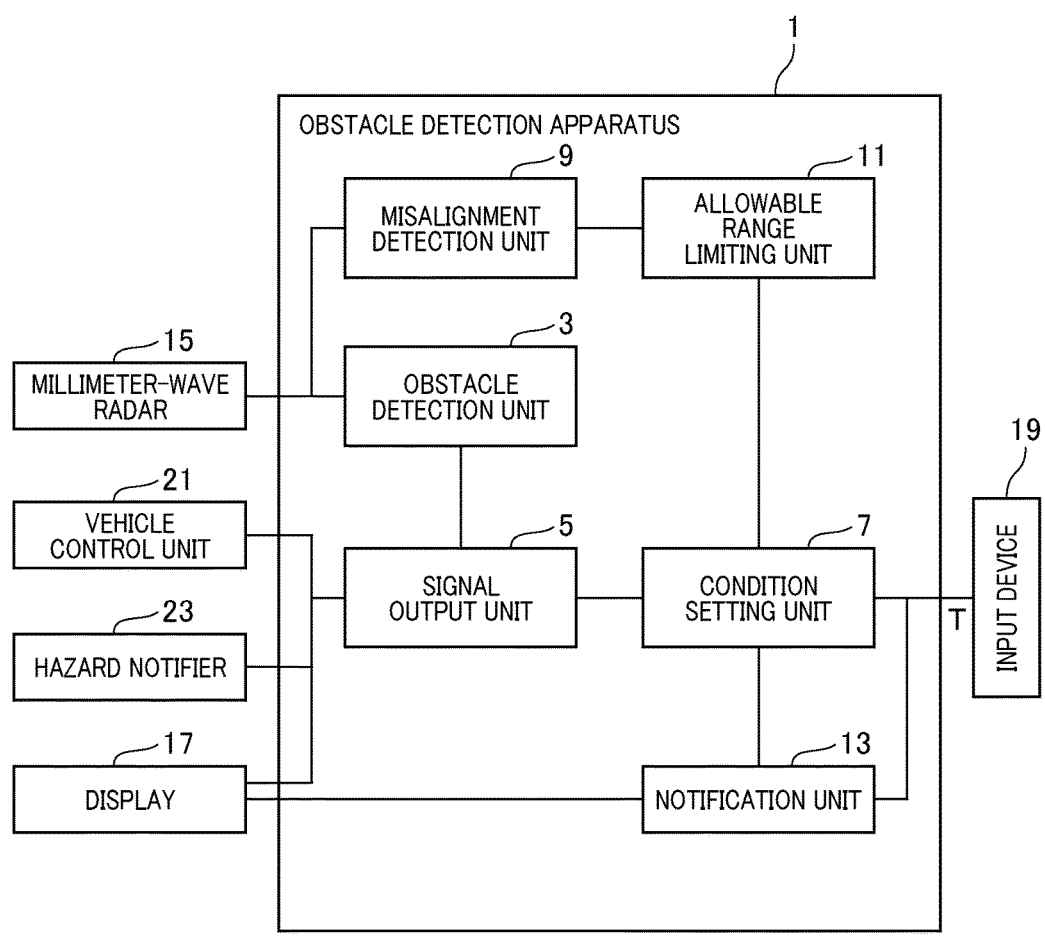
FIG. 1 is a block diagram of an obstacle detection apparatus in accordance with a first embodiment of the present invention.

An obstacle detection apparatus 1 in accordance with a first embodiment of the present invention will now be described with reference to FIG. 1. The obstacle detection apparatus 1 is mounted in a vehicle. The vehicle carrying the obstacle detection apparatus 1 is hereinafter referred to as a subject vehicle. The obstacle detection apparatus 1 may be a computer including a central processing unit (CPU), a random access memory (RAM), a read only memory (ROM) and the like. The obstacle detection apparatus 1 is configured to perform processes described later by executing computer programs stored in the ROM or the like.

The obstacle detection apparatus 1 includes an obstacle detection unit 3, a signal output unit 5, a condition setting unit 7, a misalignment detection unit 9, an allowable range limiting unit 11, and a notification unit 13. Functions of these units may be implemented by the CPU executing the computer programs stored in the ROM or the like and will be described later.

The subject vehicle includes, in addition to the obstacle detection apparatus 1, a millimeter-wave radar 15, a display 17, an input device 19, a vehicle control unit 21, and a hazard notifier 23. The millimeter-wave radar 15 is configured to emit a millimeter wave (as an example of an electromagnetic wave) and receive its reflected wave from the obstacle to detect an obstacle. The millimeter-wave radar 15 is configured to, based on a time difference between the emission of the millimeter wave and the reception of its reflected wave, calculate a distance from the subject vehicle to the obstacle. The millimeter-wave radar 15 is configured to, based on an incoming direction of the reflected wave to the subject vehicle, estimate a direction of the obstacle from the subject vehicle.

The display 17 is located inside a passenger compartment of the subject vehicle and is configured to, based on signals received from the signal output unit 5 and the notification unit 13, display an image. More specifically, the input device 19 described later is located inside the passenger compartment of the subject vehicle for receiving a driver's input. The input device 19 may be, for example, a steering switch. The input device 19 is configured to receive a time threshold T that will be described later.

The vehicle control unit 21 is configured to, based on a signal received from the signal output unit 5, conduct vehicle control to avoid collision with the obstacle. The vehicle control may include, for example, automated braking, automated steering or the like. The hazard notifier 23 is configured to receive a signal from the signal output unit 5 and conducts hazard notification. The hazard notification may include, for example, voice or image notification. The millimeter-wave radar 15 is one example of a sensor.

2. Signal Output Processing

Figure 2:
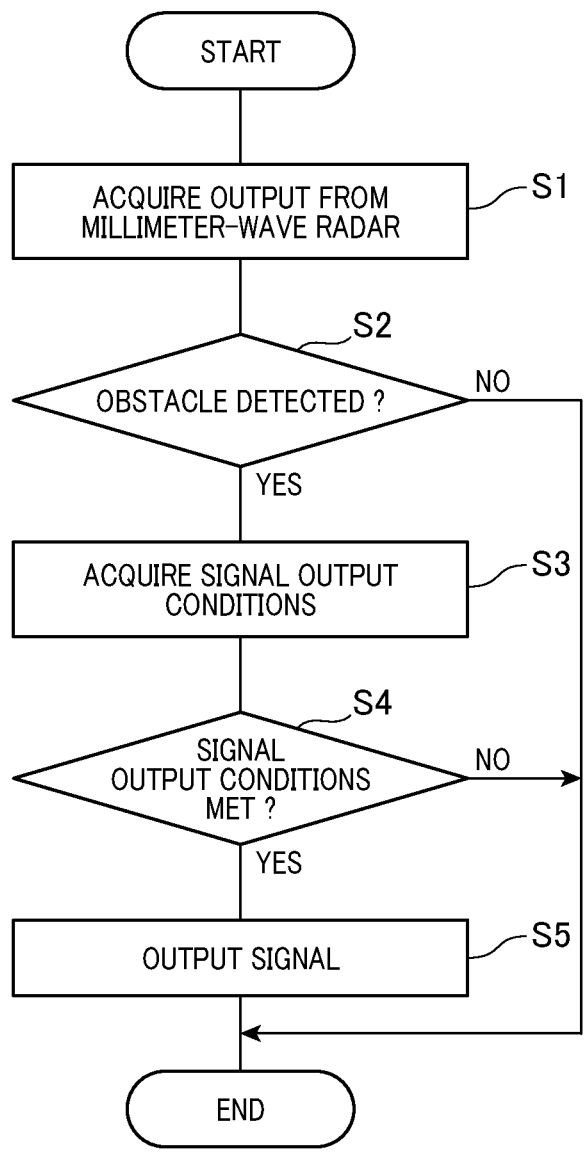
FIG. 2 is a flowchart of signal output processing to be performed in the obstacle detection apparatus of FIG. 1.

Signal output processing to be performed in the obstacle detection apparatus 1 will now be described with reference to FIGS. 2 and 3. This signal output processing is performed every predetermined time interval. In step S1 of FIG. 2, the obstacle detection unit 3 acquires output from the millimeter-wave radar 15.

In step S2, based on the output of the millimeter-wave radar 15 acquired in step S1, the obstacle detection unit 3 determines whether or not an obstacle has been detected. If an obstacle has been detected, then the process flow proceeds to step S3. Otherwise, the flow ends.

In step S3, the signal output unit 5 acquires the currently set signal output conditions. The signal output conditions include signal output conditions J1 and J2 as follows.

(Signal Output Condition J1)

A predicted collision time (TTC) to collision between the subject vehicle and the obstacle is at or below a predetermined time threshold T.

(Signal Output Condition J2)

Figure 3:
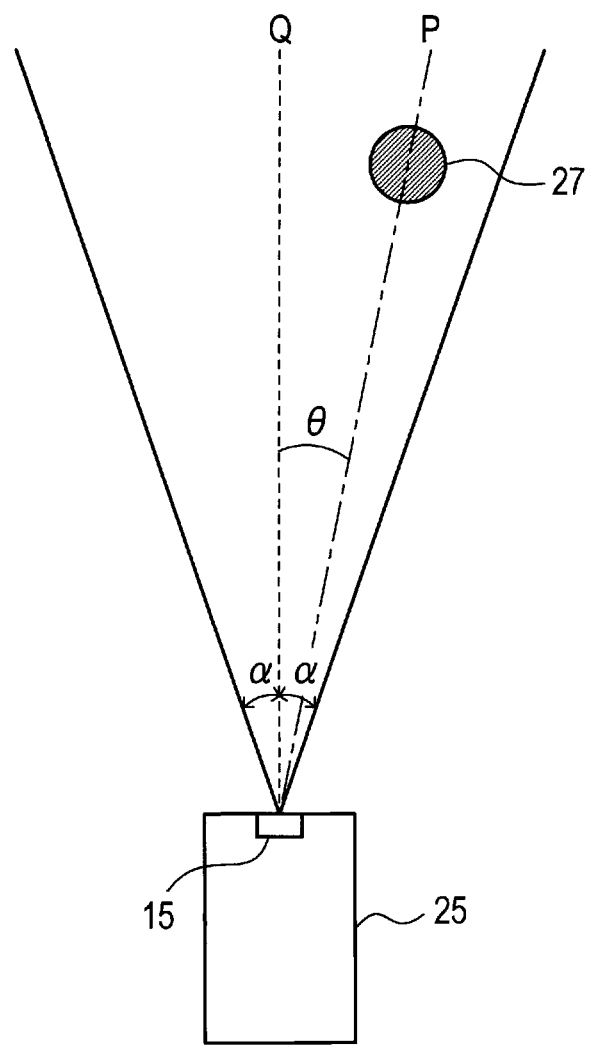
FIG. 3 is a plan view illustrating a signal output condition J2.

As shown in FIG. 3, an angle θ between a direction P of the obstacle 27 as viewed from the subject vehicle 25 and an axial direction Q of the millimeter-wave radar 15 is at or below a predetermined angle threshold α.

The predicted collision time TTC is given by D/v, where D is a distance between the obstacle and the subject vehicle 25 and v is a speed of the obstacle relative to the subject vehicle (i.e., a relative speed). The distance D can be acquired using the millimeter-wave radar 15. The relative speed v is an amount of change of the distance D per unit time. The axial direction Q of the millimeter-wave radar 15 is defined as a direction in which the emission intensity of the millimeter wave becomes maximal. Normally, the axial direction Q coincides with the longitudinal direction of the subject vehicle. Then the angle θ can be acquired using the millimeter-wave radar 15. The time threshold T is an element of the signal output condition J1. The angle threshold α is an element of the signal output condition J2. The time threshold T in the signal output condition J1 is set in signal output condition setting processing that is described later.

Returning again to FIG. 2, in step S4, the signal output unit 5 determines whether or not the obstacle detected in step S2 meets the signal output condition J1 and the signal output condition J2. If the signal output condition J1 and the signal output condition J2 are both met, the process flow proceeds to step S5. If at least one of the signal output conditions J1 and J2 is not met, then the process ends.

In step S5, the signal output unit 5 outputs a signal to each of the display 17, the vehicle control unit 21, and the hazard notifier 23. The display 17 displays a warning image in response to the signal. The vehicle control unit 21 conducts the vehicle control in response to the signal. The hazard notifier 23 conducts the hazard notification in response to the signal.

3. Signal Output Condition Setup Processing

Signal output condition setup processing to be performed in the obstacle detection apparatus 1 will now be described with reference to FIGS. 4, 5A, 5B, and 6. This signal output condition setup processing is performed every predetermined time interval. In step S11 of FIG. 4, the condition setting unit 7 determines whether or not a time threshold T has been entered into the input device 19 by a user of the subject vehicle. If a time threshold T has been entered into the input device 19 by the user, then the process flow proceeds to step S12. Otherwise, the process flow ends.

In step S12, the misalignment detection unit 9 determines whether or not misalignment of the axial direction Q of the millimeter-wave radar 15 has been detected. As described above, the axial direction Q is a direction in which the emission intensity of the millimeter wave becomes maximal. The misalignment detection unit 9 is configured to, separate from the signal output condition setup processing, detect misalignment of the axial direction Q periodically. How to detect the misalignment of the axial direction Q of the millimeter-wave radar 15 will now be described with reference to FIGS. 5A and 5B.

Figure 5A:
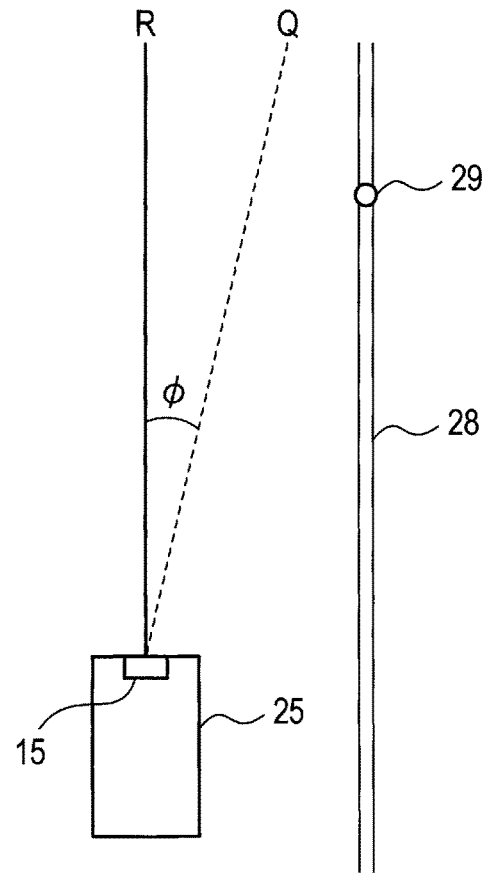
FIGS. 5A and 5B are plan views illustrating an example of how to detect misalignment of an axial direction Q of a vehicle-mounted radar.

In FIG. 5A, an angle φ between the longitudinal direction R of the subject vehicle and the axial direction Q of the millimeter-wave radar 15 is a degree of misalignment of the axial direction Q.

Figure 5B:
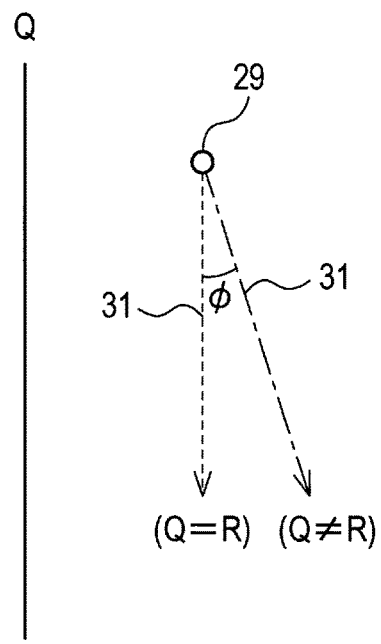

Given a target 29 (e.g., part of a guardrail 28) located on or around a traveling roadway, a location of which is kept unchanged, the location of the target 29 is continuously detected using the millimeter-wave radar 15 to detect the misalignment of the axial direction Q. Thus, as shown in FIG. 5B, a trajectory 31 of the target 29 relative to the subject vehicle 25 (i.e., a relative trajectory) is obtained. In the absence of misalignment of the axial direction Q, that is, if the axial direction Q and the longitudinal direction R of the subject vehicle coincide, the trajectory 31 becomes parallel to the axial direction Q. In the presence of misalignment of the axial direction Q, the trajectory 31 becomes non-parallel to the axial direction Q, where an angle between the trajectory 31 and the axial direction Q increases with increasing degree of misalignment of the axial direction Q. The misalignment detection unit 9 is configured to, based on the angle between the trajectory 31 and the axial direction Q, determine the presence or absence of misalignment of the axial direction Q, and the degree of misalignment of the axial direction Q.

Turning back to FIG. 4, if it is determined that misalignment of the axial direction Q has been detected, then the process flow proceeds to step S13. Otherwise, the process flow proceeds to step S17. In step S13, the misalignment detection unit 9 displays the degree of misalignment of the axial direction Q on the display 17.

In step S14, the allowable range limiting unit 11 determines whether or not the degree of misalignment of the axial direction Q (i.e., the angle ϕ) is at or below a predetermined misalignment threshold. If the degree of misalignment of the axial direction Q is at or below the predetermined misalignment threshold, then the process flow proceeds to step S15. If the degree of misalignment of the axial direction exceeds the predetermined misalignment threshold, then the process flow proceeds to step S17.

Figure 6:
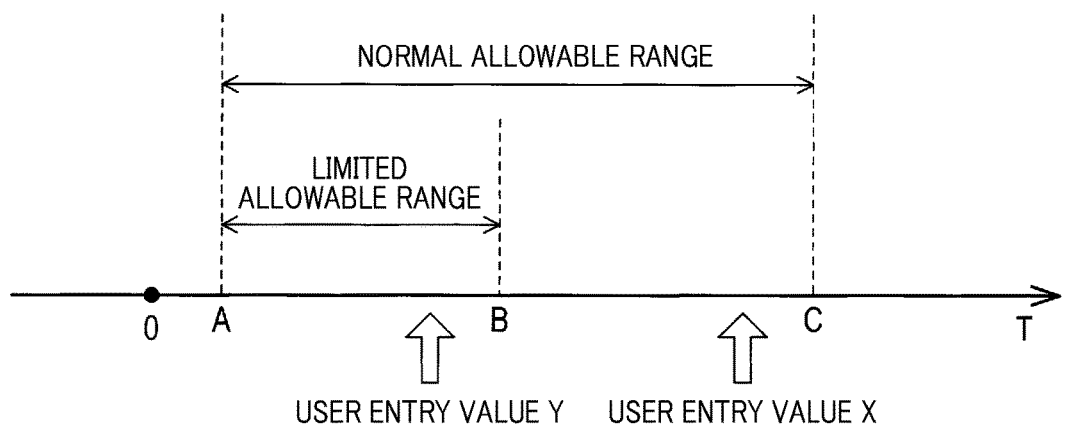
FIG. 6 is a schematic of allowable ranges of time threshold values.

In step S15, the allowable range limiting unit 11 determines a normal allowable range of time threshold values. More specifically, as shown in FIG. 6, the allowable range limiting unit 11 determines an allowable range from a lower limit A to an upper limit C, where the lower limit A and the upper limit C are positive numbers and the upper limit C is above the lower limit A.

In step S16, the condition setting unit 7 sets the time threshold T to a value within the allowable range determined in step S15 in dependence on the value entered into the input device 19 by the user. If the value entered into the input device 19 by the user is within the allowable range determined in step S15, then the time threshold T is set to the entered value. If the value entered into the input device 19 by the user is above the upper limit C, then the time threshold T is set to the upper limit C. If the value entered into the input device 19 by the user is below the lower limit A, then the time threshold T is set to the lower limit A.

If NO is determined in step S12 or S14, then the process flow proceeds to step S17, where the allowable range limiting unit 11 determines a limited allowable range that is narrower than the normal allowable range. More specifically, as shown in FIG. 6, the allowable range limiting unit 11 determines an allowable range from the lower limit A to an upper limit B, where the upper limit B is above the lower limit A, but below the upper limit C.

In step S18, the condition setting unit 7 sets the time threshold T to a value within the allowable range determined in step S17 in dependence on the value entered into the input device 19 by the user. That is, if the value entered into the input device 19 by the user is within the allowable range determined in step S17 (e.g., a value Y is entered as shown in FIG. 6), then the time threshold T is set to the user entry value, that is, the value entered by the user. If the value entered into the input device 19 by the user is above the upper limit B (e.g., a value X is entered as shown in FIG. 6), then the time threshold T is set to the upper limit B. If the value entered into the input device 19 by the user is below the lower limit A, then the time threshold T is set to the lower limit A.

In step S19, the condition setting unit 7 determines whether or not the value entered into the input device 19 by the user and the time threshold T actually set by the condition setting unit 7 are different. If the value entered into the input device 19 by the user is within the allowable range determined in step S17, then the value entered into the input device 19 by the user and the time threshold T actually set by the condition setting unit 7 coincide. If the value entered into the input device 19 by the user is above the upper limit B or if the value entered into the input device 19 by the user is below the lower limit A, the value entered into the input device 19 by the user and the time threshold T actually set by the condition setting unit 7 are different. If the value entered into the input device 19 by the user and the time threshold T actually set by the condition setting unit 7 are different, then the process flow proceeds to step S20. Otherwise, the process flow ends.

In step S20, the notification unit 13 provides a notification specific to the event that the value entered into the input device 19 by the user and the time threshold T actually set by the condition setting unit 7 are different. The notification is then displayed on the display 17.

4. Advantages (1A) A large degree of misalignment of the axial direction Q may cause an obstacle (e.g., guardrail or the like) that is not actually located in front of the subject vehicle to be incorrectly determined as being located in front of the vehicle. In such an event, a large time threshold T may cause the obstacle that is not actually located in front of the subject vehicle to meet the signal output conditions J1 and J2, which may lead to unnecessary signal output.

The obstacle detection apparatus 1 is configured to, if the degree of misalignment of the axial direction Q exceeds the predetermined misalignment threshold, limit the allowable range of time threshold values. The upper limit of the limited allowable range is below the upper limit of the unlimited allowable range. The signal output condition J1 becomes more prone to be met as the time threshold T is increased. Therefore, limiting the allowable range as above can prevent an excessively large time threshold T from being set. Thus, the signal output condition J1 becomes less prone to be met, which can prevent unnecessary signal output.

(1B) The obstacle detection apparatus 1 is configured to detect an obstacle using the millimeter-wave radar 15, which can facilitate the detection of the misalignment of the axial direction Q. This allows the distance and direction to the obstacle from the subject vehicle to be accurately detected.

(1C) The obstacle detection apparatus 1 is configured to, if the value entered by the user and the time threshold T actually set by the condition setting unit 7 are different, provide a notification specific thereto. Therefore, the user can readily know that the value entered by the user and the time threshold T actually set by the condition setting unit 7 are different.

Second Embodiment

1. Obstacle Detection Apparatus

Figure 7A:
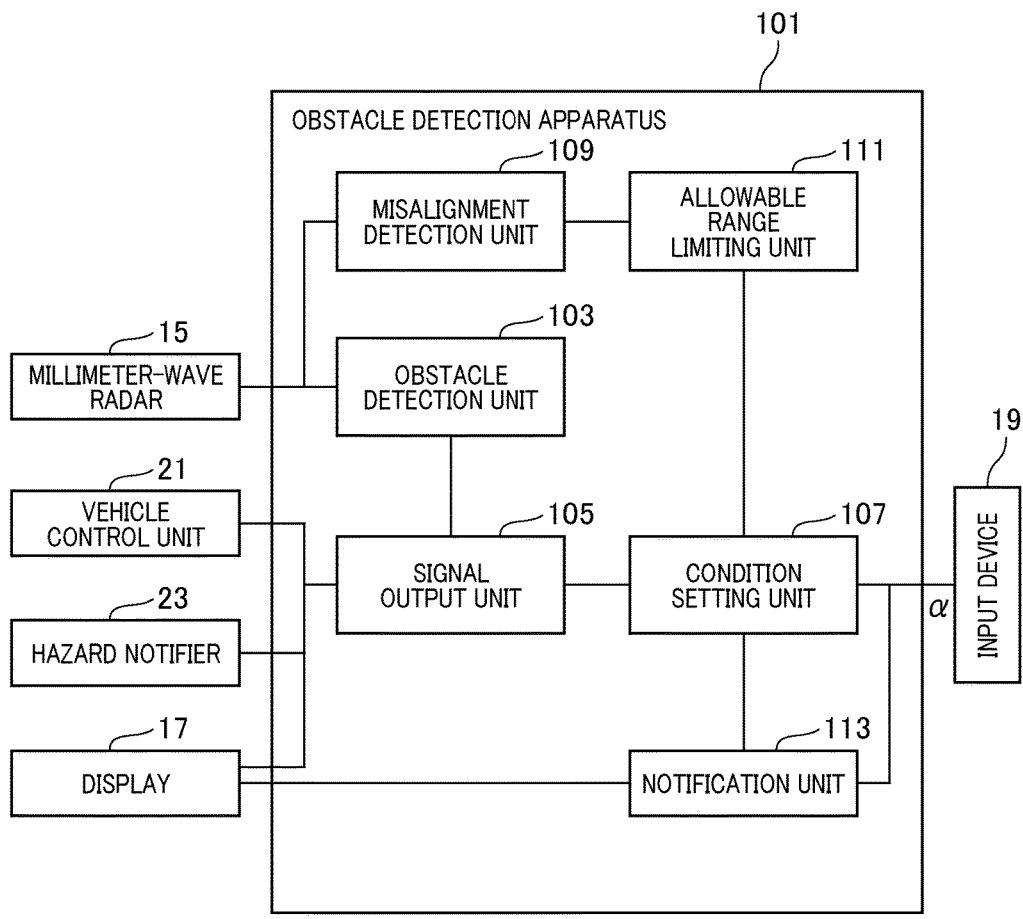
FIG. 7A is a block diagram of an obstacle detection apparatus in accordance with a second embodiment of the present invention.

Referring now to FIG. 7A, in which like numerals represent like elements, a second embodiment will be described. Labels given as "1xx" correspond to elements of the second embodiment, where "xx" is the corresponding reference number from the first embodiment where applicable. The second embodiment shares many common features with the first embodiment and therefore only differences from the first embodiment will be described in any greater detail. That is, in an obstacle detection apparatus 101 of the second embodiment, an obstacle detection unit 103, a signal output unit 105, a condition setting unit 107, an misalignment detection unit 109, an allowable range limiting unit 111, and a notification unit 113 have similar functions to those of the obstacle detection unit 3, the signal output unit 5, the condition setting unit 7, the misalignment detection unit 9, the allowable range limiting unit 11, and the notification unit 13, respectively, besides the differences described later. In the present embodiment, the input device 19 is configured to receive an angle threshold α.

2. Signal Output Processing

Signal output processing to be performed in the obstacle detection apparatus 101 of the present embodiment is similar to that of the first embodiment. That is, the signal output processing as shown in FIG. 2 is also performed in the obstacle detection apparatus 101 of the present embodiment, where like elements of the obstacle detection apparatus 101 perform like steps.

3. Signal Output Condition Setup Processing

Signal output condition setup processing to be performed in the obstacle detection apparatus 101 of the present embodiment is similar to that of the first embodiment. Only differences of the signal output condition setup processing of the second embodiment from that of the first embodiment will be described. The flowchart of FIG. 4 is also used to describe the signal output condition setup processing of the present embodiment.

In step S11 of FIG. 4, the condition setting unit 107 determines whether or not an angle threshold $\alpha$ has been entered into the input device 19 by the user of the subject vehicle. The angle threshold $\alpha$ is an element of the signal output condition J2'. If an angle threshold $\alpha$ has been entered into the input device 19 by the user, then the process flow proceeds to step S12. Otherwise, the process flow ends.

Figure 7B:
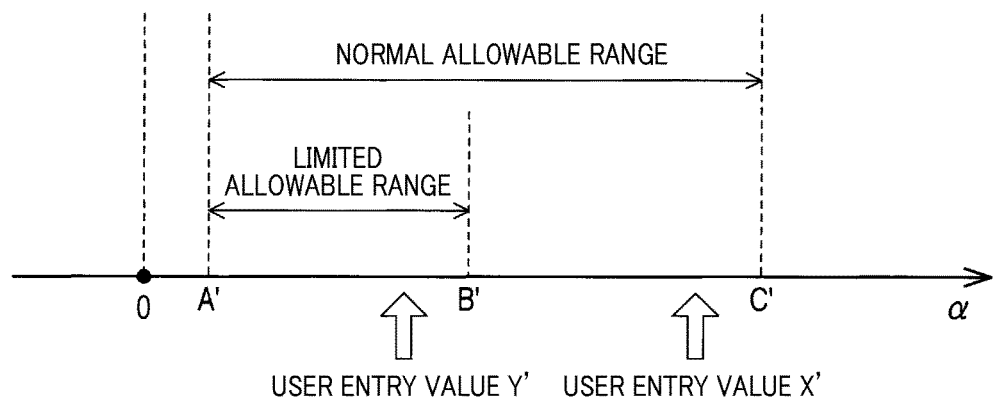
FIG. 7B is a schematic of allowable ranges of angle threshold values in accordance with the second embodiment.

In step S15, the allowable range limiting unit 111 determines a normal allowable range of angle threshold values. More specifically, as shown in FIG. 7B, the allowable range limiting unit 111 determines an allowable range from a lower limit A' to an upper limit C', where the lower limit A' and the upper limit C' are positive numbers and the upper limit C' is above the lower limit A'.

In step S16, the condition setting unit 107 sets the angle threshold $\alpha$ to a value within the allowable range determined in step S15 in dependence on the value entered into the input device 19 by the user. If the value entered into the input device 19 by the user is within the allowable range determined in step S15, then the angle threshold $\alpha$ is set to the user entry value. If the value entered into the input device 19 by the user is above the upper limit C', then the angle threshold $\alpha$ is set to the upper limit C'. If the value entered into the input device 19 by the user is below the lower limit A', then the angle threshold $\alpha$ is set to the lower limit A'.

In step S17, the allowable range limiting unit 111 determines a limited allowable range that is narrower than the normal allowable range. More specifically, as shown in FIG. 7B, the allowable range limiting unit 111 determines an allowable range from the lower limit A' to an upper limit B', where the upper limit B' is above the lower limit A', but below the upper limit C'.

In step S18, the condition setting unit 107 sets the angle threshold $\alpha$ to a value within the allowable range determined in step S17 in dependence on the value entered into the input device 19 by the user. That is, if the value entered into the input device 19 by the user is within the limited allowable range determined in step S17 (e.g., a value Y' is entered as shown in FIG. 7B), then the angle threshold $\alpha$ is set to the user entry value, that is, the value entered by the user. If the value entered into the input device 19 by the user is above the upper limit B' (e.g., a value X' is entered as shown in FIG. 7B), then the angle threshold $\alpha$ is set to the upper limit B'. If the value entered into the input device 19 by the user is below the lower limit A', then the angle threshold $\alpha$ is set to the lower limit A'.

In step S19, the condition setting unit 107 determines whether or not the value entered into the input device 19 by the user and the angle threshold $\alpha$ actually set by the condition setting unit 107 are different. If the value entered into the input device 19 by the user and the angle threshold $\alpha$ actually set by the condition setting unit 107 are different, then the process flow proceeds to step S20. Otherwise, the process flow ends.

In step S20, the notification unit 113 provides a notification specific to the event that the value entered into the input device 19 by the user and the angle threshold $\alpha$ actually set by the condition setting unit 107 are different. The notification is then displayed on the display 17.

4. Advantages

The second embodiment set forth above in detail can provide the following additional advantages to the advantage (1B) of the first embodiment.

(2A) A large degree of misalignment of the axial direction Q may cause an obstacle (e.g., guardrail or the like) that is not actually located in front of the subject vehicle to be incorrectly determined as being located in front of the vehicle. In such an event, a large angle threshold $\alpha$ may cause the obstacle that is actually located in a direction significantly away from the traveling direction of the subject vehicle to meet the signal output conditions J1 and J2', which may lead to unnecessary signal output.

The obstacle detection apparatus 101 is configured to, if the degree of misalignment of the axial direction Q exceeds the predetermined misalignment threshold, limit the allowable range of angle threshold values. The upper limit of the limited allowable range is below the upper limit of the unlimited allowable range. The signal output condition J2' becomes more prone to be met as the angle threshold $\alpha$ is increased. Therefore, limiting the allowable range as above can prevent an excessively large angle threshold $\alpha$ from being set. Thus, the signal output condition J2' becomes less prone to be met, which can prevent unnecessary signal output.

(2B) The obstacle detection apparatus 101 is configured to, if the value entered by the user and the angle threshold $\alpha$ actually set by the condition setting unit 107 are different, provide a notification specific thereto. Therefore, the user can readily know that the angle threshold $\alpha$ different from the value entered by the user has been set.

Third Embodiment

1. Obstacle Detection Apparatus

Figure 8:
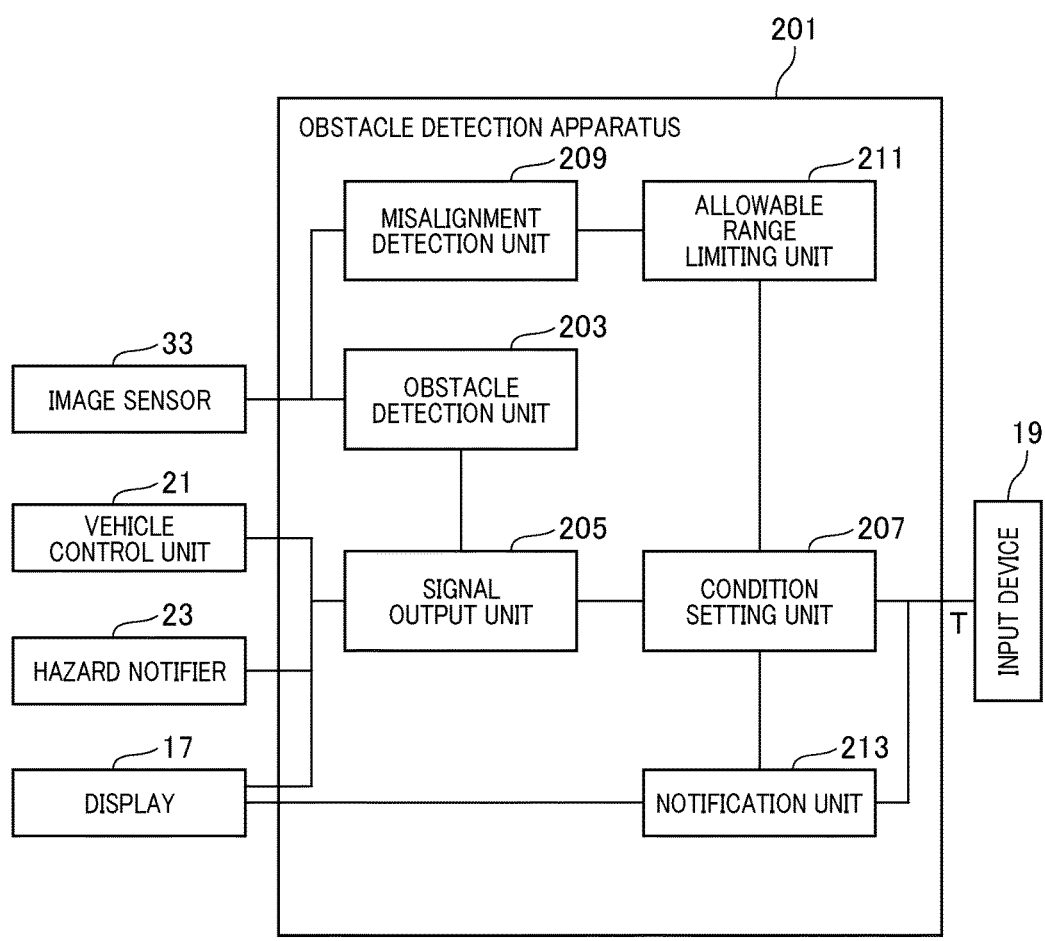
FIG. 8 is a block diagram of an obstacle detection apparatus in accordance with a third embodiment of the present invention.

Referring now to FIG. 8, in which like numerals represent like elements, a third embodiment will be described. Labels given as "2xx" correspond to elements of the third embodiment, where "xx" is the corresponding reference number from the first embodiment where applicable. The third embodiment shares many common features with the first embodiment and therefore only differences from the first embodiment will be described in any greater detail. That is, in an obstacle detection apparatus 201 of the third embodiment, an obstacle detection unit 203, a signal output unit 205, a condition setting unit 207, an misalignment detection unit 209, an allowable range limiting unit 211, and a notification unit 213 have similar functions to those of the obstacle detection unit 3, the signal output unit 5, the condition setting unit 7, the misalignment detection unit 9, the allowable range limiting unit 11, and the notification unit 13, respectively, besides the differences described later. The obstacle detection apparatus 201 includes an image sensor 33, in place of the millimeter-wave radar 15. The image sensor 33 is configured to capture a front image of the subject vehicle to produce image data.

2. Signal Output Processing

Figure 9:
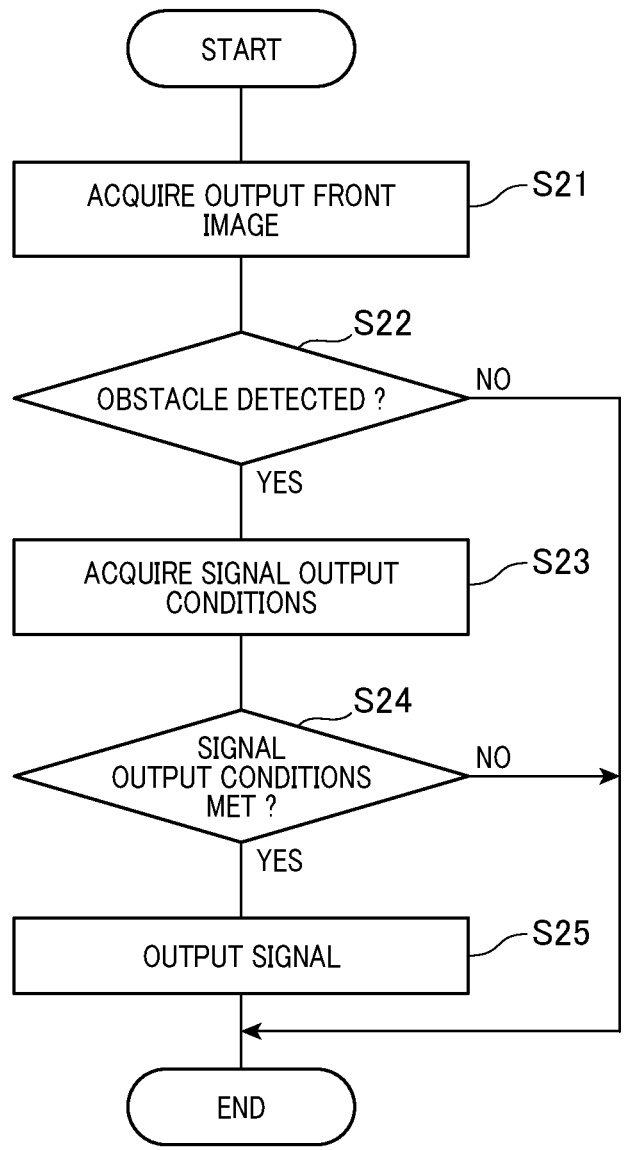
FIG. 9 is a flowchart of signal output processing to be performed in the obstacle detection apparatus of FIG. 8.

Signal output processing to be performed in the obstacle detection apparatus 201 will now be described with reference to FIGS. 9-11. This signal output processing is performed in the obstacle detection apparatus 201 every predetermined time interval. In step S21 of FIG. 9, the obstacle detection unit 203 acquires a front image captured by a vehicle-mounted image sensor 33.

In step S22, the obstacle detection unit 203 applies well-known image recognition processing to the front image captured in step S21 to determine whether or not an obstacle has been detected. If an obstacle has been detected, then the process flow proceeds to step S23. Otherwise, the flow ends.

In step S23, the signal output unit 205 acquires the currently set signal output conditions. The signal output conditions include signal output conditions J1 and J2" as follows.

(Signal Output Condition J1)

A predicted collision time (TTC) to collision between the subject vehicle and the obstacle is at or below a predetermined time threshold T.

(Signal Output Condition J2")

Figure 10:
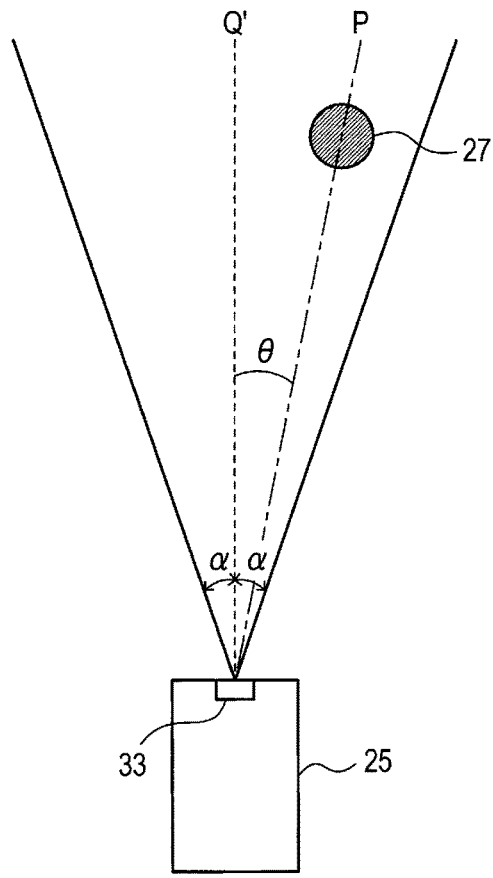
FIG. 10 is a plan view illustrating a signal output condition J2″.

As shown in FIG. 10, an angle θ between a direction P of the obstacle 27 as viewed from the subject vehicle 25 and an axial direction Q' of the image sensor 33 is at or below a predetermined angle threshold α.

The predicted collision time TTC is given by D/v, where D is a distance between the obstacle 27 and the subject vehicle 25 and v is a speed of the obstacle 27 relative to the subject vehicle 25 (i.e., a relative speed). The distance D can be acquired from the front image captured by the image sensor 33. For example, the distance D can be calculated from a relationship in vertical position in the front image between a vanishing point in the image and the obstacle. The relative speed v is an amount of change of the distance D per unit time.

Figure 11:
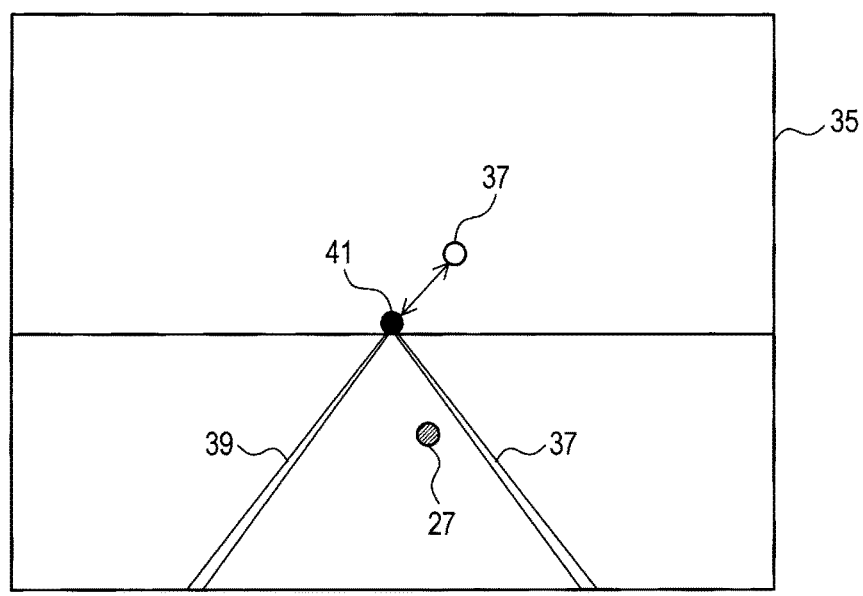
FIG. 11 is an example of detecting misalignment of an axial direction of a vehicle-mounted image sensor.

The axial direction Q' of the image sensor 33, as shown in FIG. 11, is a direction from the subject vehicle 25 to the center 37 of the front image 35 captured by the image sensor 33. The direction P is a direction from the subject vehicle 25 to the obstacle 27 in the front image 35. The angle θ can be calculated from a positional relationship between the center 37 of the front image 35 and the obstacle 27.

The axial direction Q' normally coincides with a longitudinal direction R of the subject vehicle in the absence of misalignment of the axial direction Q'. The direction R is a direction from the subject vehicle 25 to the vanishing point 41 (where a pair of white lines 37, 39 cross at infinity) in the front image 35. The time threshold T in the signal output condition J1 is set in signal output condition setting processing that is described later.

Returning again to FIG. 9, in step S24, the signal output unit 205 determines whether or not the obstacle detected in step S22 meets the signal output condition J1 and the signal output condition J2". If the signal output condition J1 and the signal output condition J2" are both met, the process flow proceeds to step S25. If at least one of the signal output conditions J1 and J2" is not met, then the process ends.

In step S25, the signal output unit 205 outputs a signal to each of the display 17, the vehicle control unit 21, and the hazard notifier 23. The display 17 displays a warning image in response to the signal. The vehicle control unit 21 conducts the vehicle control in response to the signal. The hazard notifier 23 conducts the hazard notification in response to the signal.

3. Signal Output Condition Setup Processing

Signal output condition setup processing to be performed in the obstacle detection apparatus 201 of the present embodiment is similar to that of the first embodiment. Only differences of the signal output condition setup processing of the third embodiment from that of the first embodiment will be described. The flowchart of FIG. 4 is also used to perform the signal output condition setup processing of the present embodiment.

In the present embodiment, the misalignment detection unit 209 is configured to detect misalignment between the axial direction Q' of the image sensor 33 and the longitudinal direction R of the subject vehicle. A method of detecting the misalignment is similar to the method of detecting the misalignment between the axial direction Q of the millimeter-wave radar 15 and the longitudinal direction R of the subject vehicle. In the present embodiment, the image sensor 33 is configured to continuously detect the target 29 to acquire a trajectory 31 of the target 29 relative to the subject vehicle (see FIGS. 5A and 5B). The misalignment detection unit 209 is configured to, from the angle between the trajectory 31 and the axial direction Q', determine the presence or absence of misalignment of the axial direction Q', and the degree of misalignment of the axial direction Q'.

4. Advantages

The third embodiment set forth above in detail can provide the following additional advantage to the advantages (1A), (1C) of the first embodiment.

(3A) The obstacle detection apparatus 201 can detect an obstacle using the image sensor 33. Therefore, it is possible to more accurately determine the presence or absence of the obstacle and a type of the obstacle.

Other Embodiments

It is to be understood that the invention is not to be limited to the specific embodiments disclosed above and that modifications and other embodiments are intended to be included within the scope of the appended claims.

(1) In an alternative embodiment to each of the first to third embodiments, other types of sensors than the millimeter-wave radar 15 and the image sensor 33 may be used to detect an obstacle. For example, a radar using electromagnetic waves other than the millimeter wave (e.g., laser radar or the like), sonar, LIDAR or the like may be used.

(2) In an alternative embodiment to each of the first to third embodiments, a signal output condition or conditions other than the signal output conditions J1, J2, J2', J2" may be used. For example, a condition that a distance between an obstacle and the subject vehicle is equal to or less than a distance β [m], where β is a positive number and β may be set to a value in dependence on the user entry value. If the degree of misalignment of the axial direction Q or Q' is above a predetermined misalignment threshold, β may be set to a value within a limited allowable range, for example, by lowering the upper limit of the allowable range.

(3) In an alternative embodiment to each of the first and third embodiments, only the signal output condition J1 may be provided. In the second embodiment, only the signal output condition J2' may be provided.

(4) In an alternative embodiment to each of the first to third embodiments, the input device 19 may receive both user entry values of the time threshold T and the angle threshold α. If the degree of misalignment of the axial direction Q or Q' is above its corresponding predetermined misalignment threshold, the allowable range of time threshold values and the allowable range of angle threshold values may be limited.

(5) In an alternative embodiment to each of the first to third embodiments, a way to set a value of the time threshold T or the angle threshold α if the value entered into the input device 19 by the user is out of the allowable range of time threshold values or the allowable range of angle threshold values may be selected as appropriate. The time threshold T or the angle threshold α may be set to a default value or the like.

(6) In an alternative embodiment to each of the first to third embodiments, the way to limit the allowable range if the degree of misalignment of each of the axial directions Q and Q' is above its corresponding predetermined misalignment threshold is not limited to the specifically described way, but may be selected as appropriate.

(7) In an alternative embodiment to each of the first to third embodiments, the obstacle detection apparatus 1, 101, or 201 may include means for decreasing the degree of misalignment of the axial direction Q or Q' to direct it toward the direction R. In addition, the obstacle detection apparatus 1, 101, or 201 may include means for correcting a position of the obstacle 27 depending on the degree of misalignment of the axial direction Q or Q'.

(8) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(9) Besides the obstacle detection apparatus disclosed above, the present invention may be embodied in various forms, e.g., as a system including the obstacle detection apparatus disclosed above as a component, a computer program enabling a computer to function as the obstacle detection apparatus disclosed above, computer readable medium bearing this computer program, a method of controlling the signal output conditions or the like.

What is claimed is:

1. An obstacle detection apparatus comprising:
an obstacle detection unit configured to detect an obstacle using a sensor;
a signal output unit configured to output a signal if the obstacle detected by the obstacle detection unit meets at least one preset signal output condition;
a condition setting unit configured to set at least one element of the at least one signal output condition to a value in dependence on a user entry value of the at least one element of the at least one signal output condition;
an misalignment detection unit configured to detect misalignment of an axial direction of the sensor with a longitudinal direction of a subject vehicle carrying the apparatus; and
an allowable range limiting unit configured to, if a degree of misalignment detected by the misalignment detection unit exceeds a predetermined misalignment threshold, limit an allowable range of values of the at least one element of the at least one preset signal output condition so as to make the at least one preset signal output condition less prone to be met as compared to when the degree of misalignment detected by the misalignment detection unit is at or below the predetermined misalignment threshold.

2. The apparatus of claim 1, wherein
the at least one signal output condition comprises a condition that a predicted collision time to collision between the subject vehicle and the obstacle is at or below a predetermined time threshold,
the condition setting unit is configured to set the time threshold as an element of the condition for the predicted collision time to a value in dependence on a user entry value of the time threshold, and
the allowable range limiting unit is configured to lower an upper limit of the allowable range of time threshold values.

3. The apparatus of claim 1, wherein
the at least one signal output condition comprises a condition that an angle between a direction of the obstacle as viewed from the subject vehicle and the axial direction of the sensor is at or below a predetermined angle threshold,
the condition setting unit is configured to set the angle threshold as an element of the condition for the angle to a value in dependence on a user entry value of the angle threshold, and
the allowable range limiting unit is configured to lower an upper limit of the allowable range of angle threshold values.

4. The apparatus of claim 1, wherein
the sensor is configured to detect the obstacle by emitting an electromagnetic wave and receiving its reflected wave from the obstacle, and
the axial direction of the sensor is a direction in which the emission intensity of the electromagnetic wave becomes maximal.

5. The apparatus of claim 1, wherein
the sensor is an image sensor, and
the axial direction of the image sensor is a direction from the subject vehicle to a center of an image captured by the image sensor.

6. The apparatus of claim 1, further comprising a notification unit configured to, if the user entry value of the at least one element of the at least one signal output condition and the value of the at least one element of the at least one signal output condition actually set by the condition setting unit are different, provide a notification specific to such an event.

7. The apparatus of claim 1, wherein
the at least one signal output condition comprises a first condition that a predicted collision time to collision between the subject vehicle and the obstacle is at or below a predetermined time threshold, and a second condition that an angle between a direction of the obstacle as viewed from the subject vehicle and the axial direction of the sensor is at or below a predetermined angle threshold,
the condition setting unit is configured to set the time threshold as an element of the first condition to a value in dependence on a user entry value of the time threshold, and set the angle threshold as an element of the second condition to a value in dependence on a user entry value of the angle threshold, and
the allowable range limiting unit is configured to lower an upper limit of the allowable range of time threshold values and lower an upper limit of the allowable range of angle threshold values.

8. An obstacle detection apparatus comprising:
an obstacle detection unit configured to detect an obstacle using a sensor;

a signal output unit configured to output a signal if the obstacle detected by the obstacle detection unit meets a preset signal output condition;

a condition setting unit configured to set an element of the signal output condition to a value within an allowable range of values of the element in dependence on a user entry value of the element of the signal output condition;

an misalignment detection unit configured to detect misalignment of an axial direction of the sensor with a longitudinal direction of a subject vehicle carrying the apparatus; and an allowable range limiting unit configured to, if a degree of misalignment detected by the misalignment detection unit exceeds a predetermined misalignment threshold, limit the allowable range of values of the element of the signal output condition so as to make the signal output condition less prone to be met as compared to when the degree of misalignment detected by the misalignment detection unit is at or below the predetermined misalignment threshold.

* * * * *